Dec. 29, 1959  D. L. MILLER  2,919,001
CENTRIFUGALLY CONTROLLED OVERRUNNING TRANSMISSION
Filed May 20, 1957
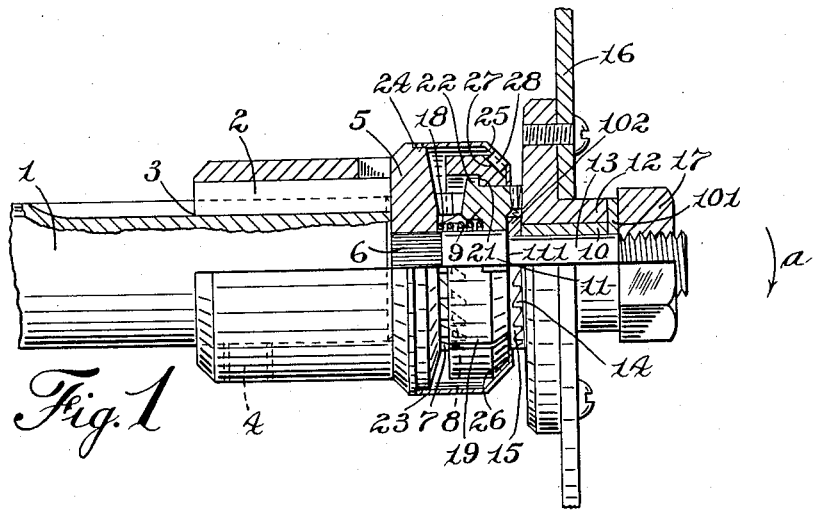
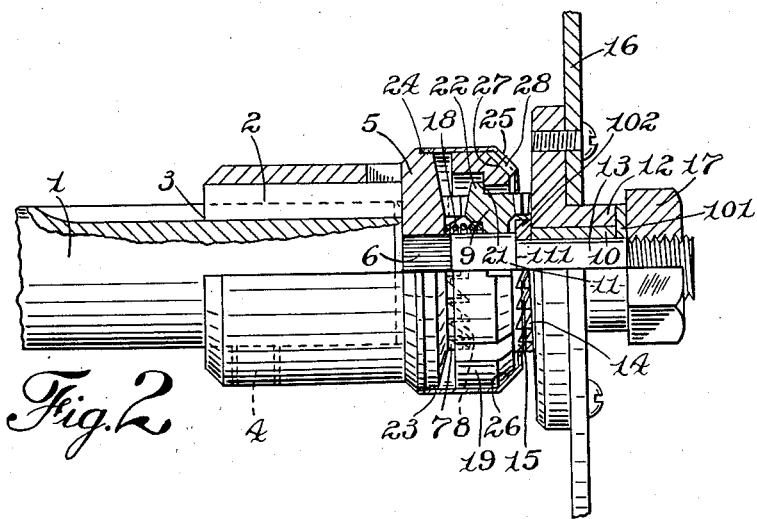
WITNESS:
Esther M. Stockton
INVENTOR.
Donald L. Miller
BY
Clinton S. James
ATTORNEY

United States Patent Office 2,919,001
Patented Dec. 29, 1959

2,919,001

CENTRIFUGALLY CONTROLLED OVERRUNNING TRANSMISSION

Donald L. Miller, Horseheads, N.Y., assignor to Bendix Aviation Corporation, Elmira Heights, N.Y., a corporation of Delaware Application May 20, 1957, Serial No. 660,355

4 Claims. (Cl. 192—104)

The present invention relates to a centrifugally controlled overrunning transmission, and more particularly to a transmission of this type which is particularly adapted to the starting of internal combustion engines.

It is an object of the present invention to provide a novel self-energizing overrunning transmission which is sturdy in construction, reliable in operation and simple and economical in construction.

It is another object to provide such a device which is so constructed as to engage positively and firmly during the driving operation, and to overrun quietly and without frictional contacts other than simple bearing engagement.

Further objects and advantages will be apparent from the following description taken in connection with the accompanying drawing in which:

Fig. 1 is a side elevation of a preferred embodiment of the invention showing the parts in driving position;

Fig. 2 is a similar view showing the parts in the positions assumed when the driven shaft is overrunning the driving member.

In Fig. 1 of the drawing there is illustrated a driven shaft 1 which may be the crank shaft of an internal combustion engine to be started. A driven coupling member 2 is rigidly mounted on the driven shaft 1 as by means of keys or splines 3 and a set screw 4. Said coupling member is formed with a portion 5 of reduced internal diameter which may be pressed on a knurled reduced section 6 of the driven shaft. The driven coupling member 2 also has a plurality of axially extending projection or teeth 7 with axially inclined torque transmitting surfaces adapted to cooperate with similar teeth 8 on an intermediate coupling member 9 which is slidably journalled on a smooth reduced section 11 of the driven shaft.

A driving clutch member 12 is rotatably mounted on a bushing 10 located on a further smooth reduced portion 13 of the driven shaft 1 and has a series of overrunning clutch teeth 14 adapted to cooperate with similar teeth 15 on the intermediate coupling member 9. The driving clutch member 12 is arranged to be rotated by a member 16 which may be a gear driven by a starting motor not illustrated, and longitudinal movement of the driving clutch member on the bushing 10 is prevented by thrust washers 101 and 102, the bearing assembly of said thrust washers and the bushing 10 being clamped against the shoulder 111 of the shaft 1 by a stop nut 17 threaded on the end of said shaft.

A compression spring 18 is located between the coupling members 9, 2 tending to separate them and thus maintain engagement of the overrunning clutch teeth 14, 15. The stop nut 17 is so located that the inclined driving projections 7, 8 of the coupling members 2, 9 respectively are maintained in engagement as shown in Fig. 1.

Means are provided for drawing the intermediate coupling member 9 out of engagement with the driving clutch member 12 responsive to rotation of the driven shaft above a predetermined speed. As here shown this means comprises a plurality of segmental weight members 19 mounted on the intermediate coupling member 9 and having internal shoulders 21 engaging a radial flange 22 on said coupling member. A sleeve 23, fixed to the driven coupling member 2 in any suitable manner as indicated at 24 is arranged to loosely surround the weight members 19 and is formed with a tapered portion 25 positioned to be engaged by the weight members 19 as they are moved outward by centrifugal force. The weight members are preferably formed with similarly tapered portions 26 for engagement with the section 25 of sleeve 23 whereby outward movement of the weight members 19 causes them to move to the left in Fig. 1, drawing the intermediate coupling member 9 away from the driving clutch member 12 to disengage the overrunning clutch teeth 14, 15 as shown in Fig. 2.

In order to ensure rotation of the weight members 19 with the intermediate coupling member 9 and shaft 1, they may be formed with slots or pockets 27 adapted to receive tongues 28 which are sheared and pressed inwardly from the section 25 of the sleeve 23 to thus provide a keying connection from the sleeve to the weight members.

In operation, starting with the parts in the positions illustrated in Fig. 1, rotation of the gear 16 and driving clutch member 12 in the direction of the arrow (a) is transmitted through the overrunning clutch teeth 14, 15 to the intermediate coupling member 9, and from the latter to the driven coupling member 2 by means of the inclined projections 8, 7. The inclination of the driving surfaces of said projections is such as to cause a wedging or expansive reaction between these members which forces the overrunning clutch teeth 14, 15 together to provide firm and positive engagement thereof. The expansive movement of the parts is limited, on the one hand, by the shoulder on shaft 1 against which the portion 5 of the driver coupling member 2 is seated, and on the other hand, by the thrust washer 101 and nut 17 which confine the driving clutch member 12 on its bearing 10. The consequent rotation of the driven coupling member 2, causes rotation of the driven shaft 1 to crank the engine to be started.

When the engine becomes self-operative, the acceleration of the driven shaft 1 relieves the load on the coupling projections 7, 8 and thereby permits the intermediate coupling member 9 to overrun the driving clutch member 12. When the shaft 1 attains a predetermined speed, preferably at or above the free-spin speed of the starting motor and driving clutch member 12, the weight members 19 move outwardly by centrifugal force, compressing the clutch spring 18, and withdrawing the clutch teeth 15 from the clutch teeth 14 as shown in Fig. 2. From then on, during the operation of the engine, the driving clutch member 12 merely bears freely on the rotating bushing 10, without contact with the intermediate coupling member 9.

In case of a so-called "false start," in which the engine shaft 1 does not attain and maintain a speed of rotation higher than that of the driving clutch member 12, when the engine speed falls to that of said clutch member, the spring 18 is effective to overcome the holding effect of the weight members 19 and cause reengagement of the clutch teeth 15, 14 whereupon cranking of the engine is resumed until the engine is reliably self-operative.

Although but one embodiment of the invention has been shown and described in detail it will be understood that changes may be made in the design and arrangement of the parts without departing from the spirit of the invention.

I claim:

1. In a self-energizing overrunning transmission, a driven shaft, a driven coupling member fixedly mounted thereon, an intermediate coupling member slidably journaled on said shaft, said coupling members having cooperating axially-inclined torque-transmitting teeth, a driving clutch member journalled on said shaft, said clutch member and intermediate coupling member having interengaging overrunning clutch teeth, a spring urging the intermediate coupling member toward the clutch member, means for rotating said clutch member to drive the intermediate coupling member and co-operating means mounted on said intermediate coupling member and driven coupling member, and connected to rotate therewith for drawing the intermediate coupling member away from the driving clutch member responsive to rotation of the driven shaft above a predetermined speed.

2. A transmission as set forth in claim 1 including further, abutment means on said shaft engaging said driving clutch member and driven coupling member preventing axial movement of said members and so spacing them axially on the shaft that the intermediate coupling member is maintained in operative engagement with the driven coupling member at all times.

3. A transmission as set forth in claim 2 in which the means for drawing the intermediate coupling member away from the driving clutch member comprises a plurality of segmental weight members mounted on and having an axial thrust connection to one of said coupling members, and a sleeve fixed to the other coupling member loosely surrounding said weight members and said intermediate coupling member and having a tapered portion engaged by the weight members as they move outward by centrifugal force.

4. In a self-tightening overrunning transmission, a driven shaft, a driven coupling member fixedly mounted thereon and having a plurality of axially extending inclined torque-transmitting projections, an intermediate coupling member slidably journaled on said shaft and having a plurality of axially extending inclined projections cooperating with those of the driven coupling member to wedge the coupling members apart responsive to the transmission of torque thereby, a driving clutch member journaled on the shaft adjacent the intermediate coupling member, said last-mentioned members having cooperating overrunning clutch teeth, thrust bearing means on the shaft so positioning the driving clutch member as to prevent disengagement of the coupling members, a spring tending to separate the coupling members and thus cause engagement of the overrunning clutch teeth, a plurality of weight members mounted on the intermediate coupling member with freedom for radial movement while connected for axial movement in unison with said intermediate coupling member, and a sleeve fixedly mounted on the driven coupling member loosely surrounding said weight members and having an axially tapered terminal portion positioned to be engaged by the weight members as they move outward by centrifugal force; said sleeve and weight members having interengaging means forming a splined connection therebetween.

References Cited in the file of this patent

UNITED STATES PATENTS

| | | |
|---|---|---|
| 2,538,300 | Digby | Jan. 16, 1951 |
| 2,554,445 | Miller | May 22, 1951 |
| 2,593,167 | Miller | Apr. 15, 1952 |
| 2,720,299 | Niemela | Oct. 4, 1955 |

FOREIGN PATENTS

| | | |
|---|---|---|
| 188,507 | Great Britain | Nov. 16, 1922 |
| 259,013 | Italy | June 12, 1928 |